United States Patent [19]

Hysom

[11] 4,085,732
[45] Apr. 25, 1978

[54] METHOD AND APPARATUS FOR HEATING A LIQUID USING SOLAR ENERGY

[76] Inventor: Ervin E. Hysom, 2307 Hyacinth, Wichita, Kans. 67204

[21] Appl. No.: 693,349

[22] Filed: Jun. 7, 1976

[51] Int. Cl.² .............................................. F24J 3/02
[52] U.S. Cl. ................................................... 126/271
[58] Field of Search ............... 126/270, 271; 237/1 A; 62/347

[56] References Cited

U.S. PATENT DOCUMENTS

| | | | |
|---|---|---|---|
| 3,146,774 | 9/1964 | Yellott | 126/271 |
| 3,206,944 | 9/1965 | Gallo | 62/347 |
| 3,254,643 | 6/1966 | Thomason | 126/271 |
| 3,411,163 | 11/1968 | Myers, Jr. | 126/271 |
| 3,722,227 | 3/1973 | Esser et al. | 62/347 |
| 3,937,208 | 2/1976 | Katz et al. | 126/271 |
| 3,995,804 | 12/1976 | Folds | 126/271 |
| 4,003,365 | 1/1977 | Wiegand | 126/271 |

Primary Examiner—Kenneth W. Sprague
Assistant Examiner—James C. Yeung
Attorney, Agent, or Firm—Edwin H. Crabtree; John H. Widdowson

[57] ABSTRACT

A method and apparatus for heating a liquid using solar energy. Through the use of an absorber plate made of a sheet of copper or any other similar conductive metal, the heat from the sun is captured. The front surface of the plate is covered with a dark absorbent coating. The heat absorbed by the copper sheet is conducted to a thin film of liquid such as water which is fed by gravity down the backside of the plate from a supply line disposed adjacent to the top of the backside of the plate. The liquid absorbs the heat from the plate as it flows downward covering the backside of the plate and is discharged at the bottom of the plate into a drain line. The drain line removes the heated liquid from the apparatus.

6 Claims, 8 Drawing Figures

U.S. Patent  April 25, 1978  Sheet 1 of 2  4,085,732
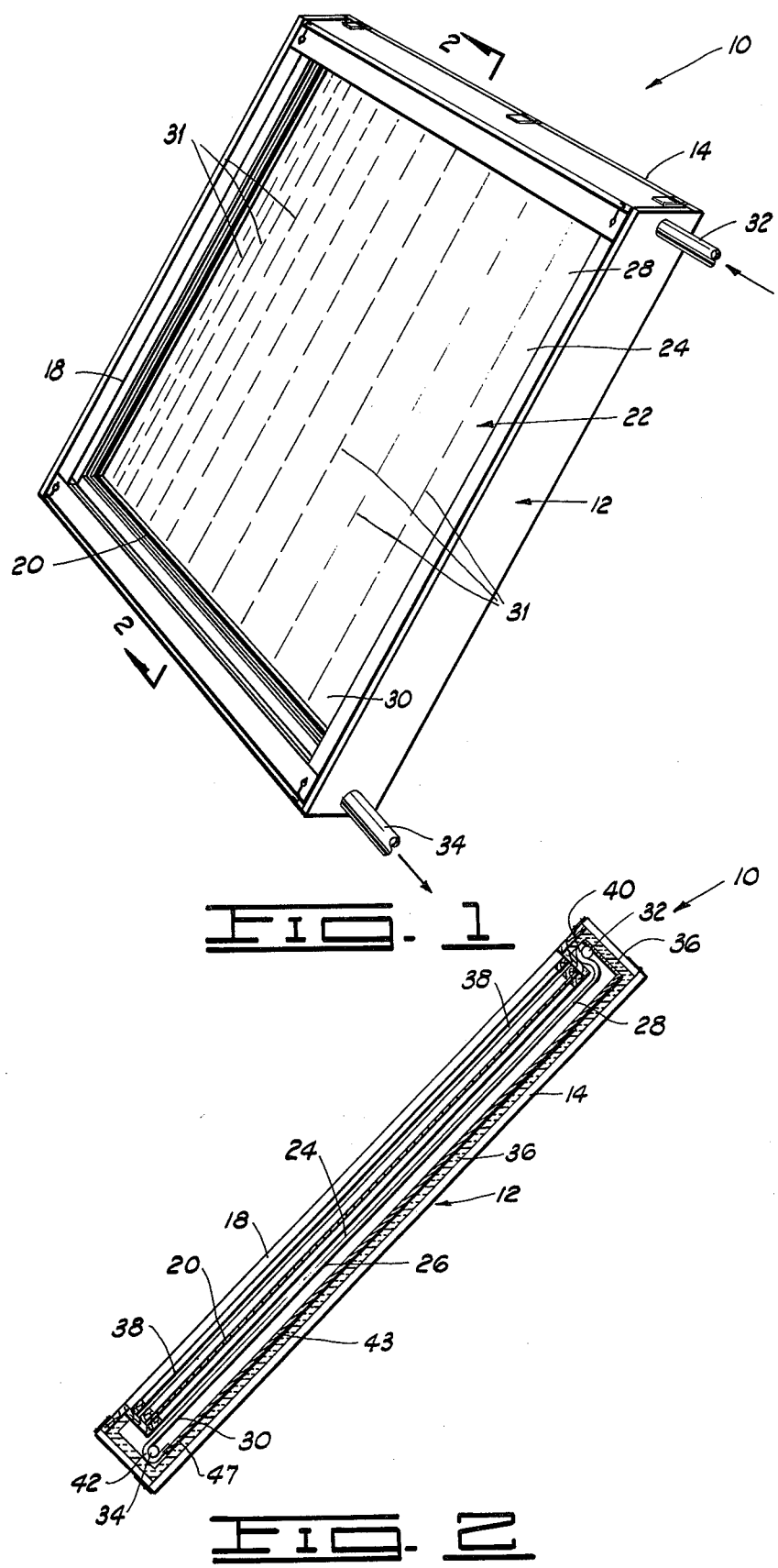

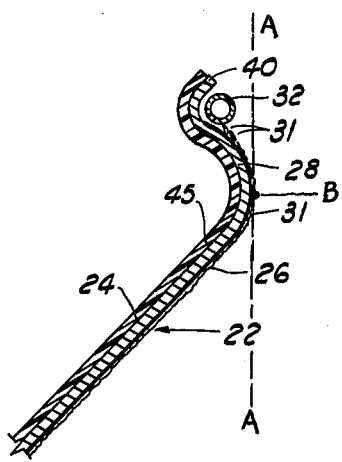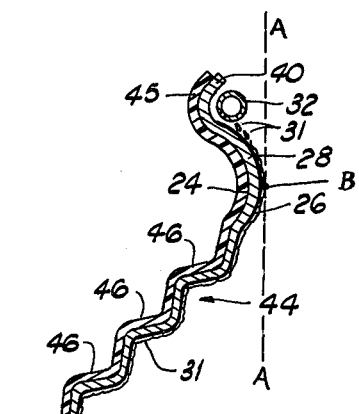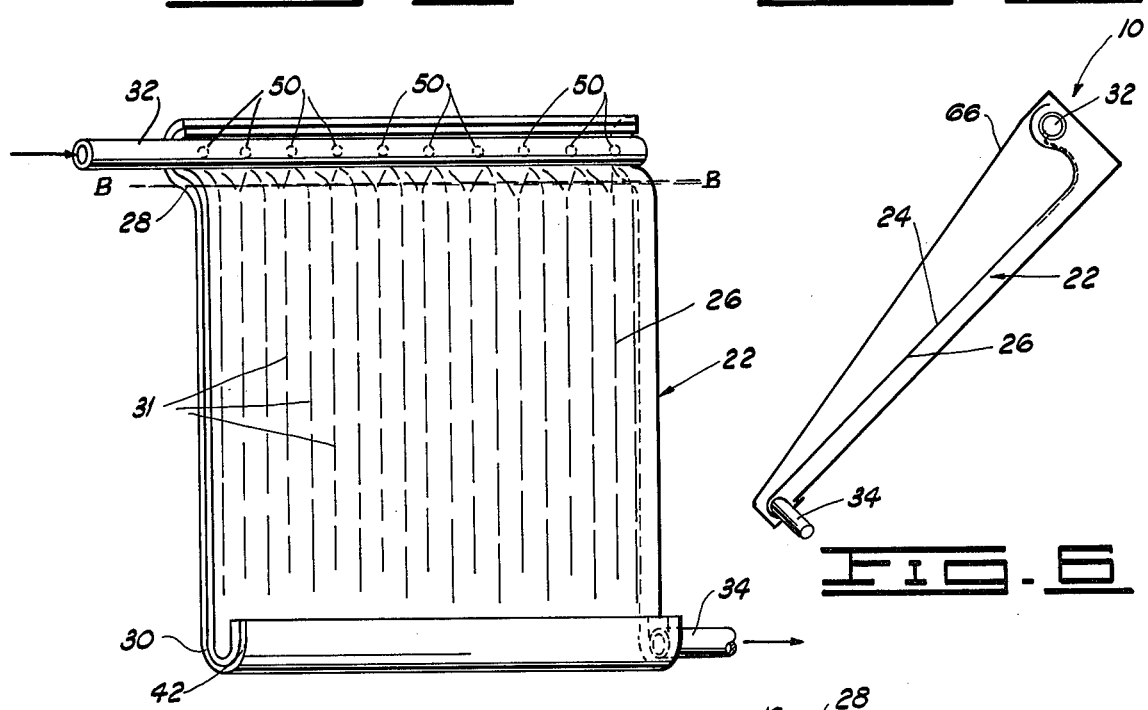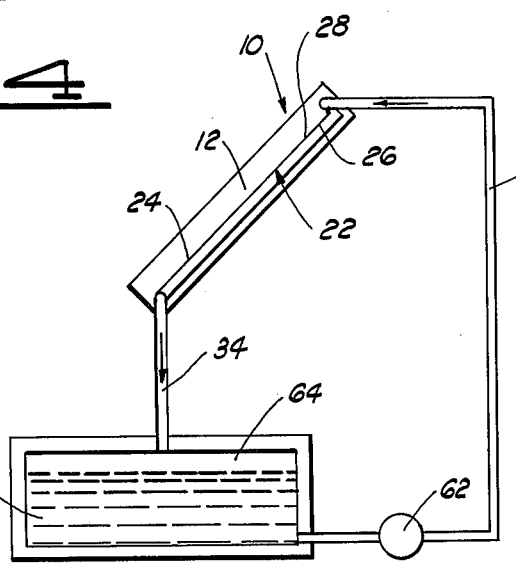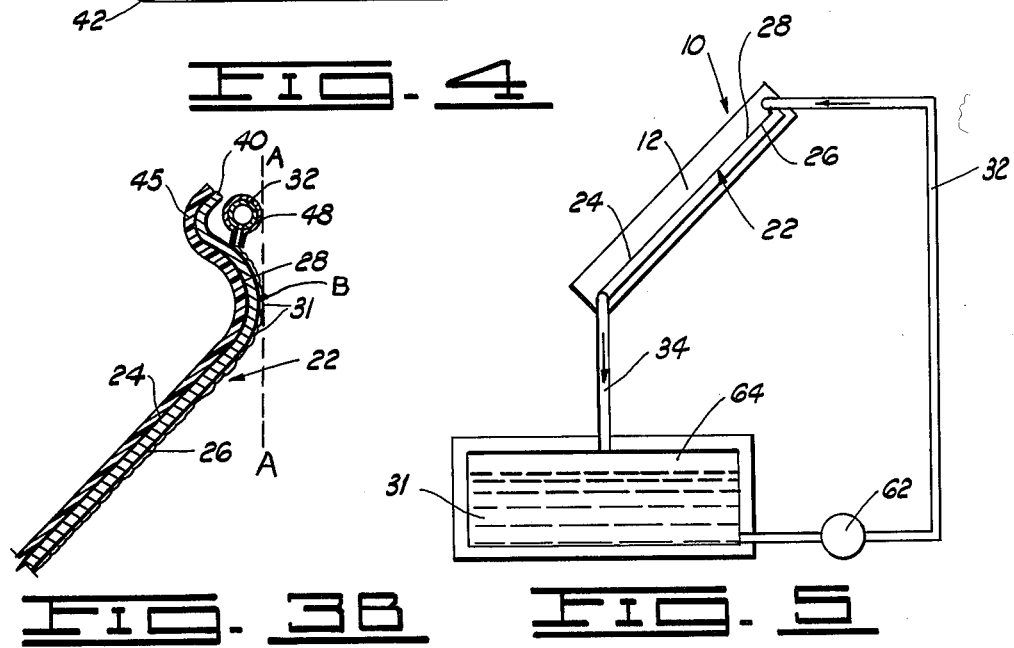

METHOD AND APPARATUS FOR HEATING A LIQUID USING SOLAR ENERGY

BACKGROUND OF THE INVENTION

This invention relates generally to solar energy collectors and more particularly but not by way of limitation to a method and apparatus for heating a fluid using solar energy.

Heretofore there have been a great number of different types and designs of solar energy collectors for heating air and liquid. The solar energy collectors are used for both heating and cooling industrial and residential building structures. Prior art liquid heaters generally are constructed where a liquid such as water is circulated down the front side of an absorber plate. The absorber plate absorbs the solar heat and conducts the heat to the water as it flows across the surface. This type of system is not as efficient as the subject invention since the film of water acts to reflect some of the sun's rays prior to being absorbed by the plate. Also, this type of collector will have a transparent cover such as glass positioned in front of the absorber plate. Because of the heat generated on the absorber plate, the water will evaporate and condense on the inside surface of the cover thereby creating a fogging effect thereon and reducing the efficiency of the collector.

Also there are collectors which circulate the liquid in heat absorbent conductor tubes or channels which flows across the front surface of the solar panel. The use of tubes or channels do not allow the liquid to be exposed in a thin film to the maximum surface area of the panel. Therefore, again this system is not as efficient as the subject invention which takes advantage of most of the solar heat received on the surface of an absorber plate.

SUMMARY OF THE INVENTION

The subject invention circulates a liquid down the backside of an absorber plate thereby taking advantage of the maximum surface area of the absorber plate. Also the liquid is circulated in a thin film down the backside of the absorber plate so that the liquid does not reflect the sun's rays which are being absorbed by the front surface of the absorber plate.

The absorber plate is mounted in an insulated housing for maximum heat retention in the heating of the liquid. The housing includes a transparent cover mounted in front of the front surface of the absorber plate and parallel thereto. The transparent cover prevents the circulation of air on the surface of the absorber plate which oterwise would allow the loss of heat by convection and cool the plate surface thereby reducing its efficiency. Also because of the liquid is circulated down the backside of the plate, evaporation and condensation do not occur in the rear of the insulated housing due to the tight enclosure of the housing and the efficiency of receiving the sun's rays through the transparent cover is not reduced.

The front surface of the absorber plate is coated with a dark absorbent material such as a flat black coating or a dark selective coating or provide for the maximum efficiency in absorbing the sun's rays on the absorber plate. The absorber plate may be made of a flat surface or a corrugated surface. The corrugated surface increases the surface area exposed to the sun.

The top portion of the absorber plate is curved around the supply line for receiving the liquid thereon and allows the absorber plate to be positioned at various angles from the horizontal without the liquid flowing from the supply line and dripping onto the insulated housing rather than being retained on the backside of the absorber plate by surface tension.

The subject invention is simple in design and rugged in structure. The invention is inexpensive as compared to prior art solar collectors. These collectors are often complex in design and are generally expensive to construct and install.

The apparatus for heating a liquid using solar energy includes an insulated housing having a transparent cover framed therein. An absorber plate having a front side and a backside is mounted in the housing with the front side of the plate disposed adjacent the transparent cover. The front side of the plate is covered with a dark absorbent coating. A supply line is disposed adjacent the top of the backside of the plate. The supply line which has a plurality of apertures therein feeds a liquid such as water down the backside of the plate. The liquid flowing downward by gravity over the surface of the backside of the absorber plate absorbs the solar heat which is conducted from the front side of the absorber plate. The heated liquid is received at the bottom of the backside of the plate in a drain line. The drain line discharges the heated liquid from the apparatus.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective view of the apparatus for heating a liquid using solar energy.

FIG. 2 is a side sectional view of the apparatus taken along lines 2—2.

FIG. 3 is a side sectional view of the top portion of the absorber plate.

FIG. 3A is similar to FIG. 3 but illustrates a corrugated absorber plate.

FIG. 3B illustrates a side sectional view of the top portion of the absorber plate wherein the supply tube has a wick mounted therearound for distributing the liquid on the backside of the absorber plate.

FIG. 4 is a front view of the backside of the absorber plate.

FIG. 5 illustrates a flow diagram of a typical liquid supply system connected to the subject invention.

FIG. 6 illustrates an alternate embodiment of the apparatus.

DETAILED DESCRIPTION OF THE DRAWINGS

In FIG. 1 the apparatus for heating a liquid using solar energy is designated by general reference numeral 10. The apparatus 10 includes an insulated housing 12 having a hinged back portion 14 for access inside the housing 12 and servicing the apparatus 10. The housing 12 includes an open front portion 18 with a transparent cover 20 mounted therein. The transparent cover 20 may be made of glass, polyester synthetics or any other transparent type material that can withstand the high tempertures obtained in the apparatus 10 during a sunny day. Disposed behind the transparent cover 20 is an absorber plate 22 made of a copper sheet or any other similar conductive metal. The absorber plate 22 includes a front side 24 and a backside 26. The backside 26 is shown in FIGS. 2, 3, and 4. The absorber plate 22 further includes a top portion 28 and a bottom portion 30. The front side 24 of the plate 22 receive the run's rays through the transparent cover 20 and thereon. The heat absorbed on the front side is conducted to the backside 26 of the plate 22. The cover 20 protects the plate 22 from outside air currents and helps retain the heat absorbed inside the insulated housing 12.

In this figure dotted lines are shown illustrating a flow of a liquid 31 such as water. The liquid 31 flows downward by gravity on the backside 26 of the absorber plate 22. A supply line 32 is shown entering the side of the housing 12 and is disposed adjacent the top portion 28 of the backside 26 of the absorber plate 22. A drain line 34 is shown extending outwardly from the side of the housing 12 for discharging the liquid 31 from the apparatus 10.

In FIG. 2 a side sectional view of the apparatus 10 taken along lines 2—2 shown in FIG. 1 is illustrated. In this view the housing 12 can be seen having insulating material 36 attached around the inside periphery of the housing 12. The transparent cover 20 can be seen framed in the front portion 18 of the housing 12. An additional frame slot 38 is illustrated parallel to the transparent cover 20. The frame slot 38 can be used for mounting a second transparent cover therein. The additional cover will help reduce heat loss to the outside during low ambient temperatures.

Also seen in this view is the top portion 28 of the absorber plate 22 which is curved forwardly toward the front of the housing 12 and includes an upper edge portion 40 curved around a portion of the supply tube 32. By curving the top portion 28 of the absorber plate 22, the liquid 31 can be fed from the supply tube 32 onto the backside 26 of the absorber plate 22 and held thereon by surface tension without the liquid 31 dripping directly onto the rear of the housing 12 as the housing 12 is tilted at various angles from the horizontal for proper positioning the apparatus 10 toward the sun. To make sure the liquid 31 is distributed onto the backside 26 of the plate 22, the supply tube 32 is disposed above the curved top portion 28 and adjacent a vertical plane shown in FIGS. 3, 3a and 3b as a dashed line A—A. The line A—A is tangent to the backside 26 of the plate 22 at a point B. Point B is where the top portion 28 begins to curve upwardly and below a portion of the supply tube 32. Point B is shown in FIGS. 3, 3a, 3b and as a dashed horizontal line B—B in the FIG. 4. The bottom portion 30 of the absorber plate 22 includes a lower edge portion 42 which is curved rearwardly into a U-shape. By forming the lower edge portion 42 into a U-shape it acts as a collector for the heated liquid 31 and is used for discharging the liquid 31 into the drain line 34.

A vapor barrier 43 is attached over the insulating material 36 at the rear of the housing 12. The barrier 43 protects the insulating material 36 from condensation of the liquid 31 as it is heated inside the rear of the housing 12. Also a lower edge portion 47 of the barrier 43 is adjacent and tangent to the U-shaped edge portion 42 so that any condensation collecting on the barrier 43 will flow downward into the edge portion 42 and not collect in the bottom of the housing 12.

In FIG. 3 a partial section of the top portion 28 of the absorber plate 22 is illustrated. In this figure a dark absorbent coating 45 is shown coating the front side 24 of the absorber plate 22. The coating 45 may be a flat black, a dark selective coating, or any other type coating to aid in heat absorption. Also seen in this view is the flow of the liquid 31 being discharged from the supply line 32, dripping onto the backside 26 of the absorber plate 22, and flowing downward by gravity. The housing 12 with the plate 22 mounted therein can be positioned at various angles with the sun. These positions may be from a vertical position downward to a position at an angle of approximately 20° from the horizontal. Due to the surface tension between the plate 22 and the liquid 31, the liquid 31 will continue to flow downward by gravity on the backside 26 of the absorber plate 22 and remain thereon without dripping off.

FIG. 3A illustrates an alternate embodiment of the absorber plate 44 which is corrugated. In this illustration corrugations 46 are transverse to the flow of the liquid 31 down the backside 26 of the absorber plate 44 thereby increasing the surface area covered by the flow of the liquid 31. By increasing the surface area it can be understood that the liquid 31 will have a greater opportunity to absorb heat from the plate 44 thereby increasing the temperature of the liquid 31.

FIG. 3B is similar to FIG. 3 but includes the additional feature of a wick 48. The wick 48 is disposed around the supply tube 32. The wick 48 acts to receive the liquid 31 from the supply tube 32 and distributes the liquid 31 evenly across the top portion 28 of the backside 26 of the absorber plate 22.

In FIG. 4 the backside 26 of the absorber plate 22 is illustrated. In this view the supply tube 32 can be seen having a plurality of apertures 50 positioned adjacent the top portion 28. The liquid 31 can be seen illustrated as dotted lines flowing evenly over the surface of the backside 26 of the absorber plate 22 downward until it is received into the U-shaped lower edge portion 42 and discharged into the drain line 34.

In FIG. 5 a typical supply system for storing the heated liquid 31 is attached to the apparatus 10. In operation the apparatus 10 is positioned to face the sun. A pump 62 is connected to the bottom of a supply tank 64. From the supply tank 64, the liquid 31 is pumped through the supply line 32. The liquid 31 is fed through the supply line 32 onto the top portion 28 of the backside 26 of the absorber plate 22. The liquid 31 feeds downward by gravity over the backside 26 of the absorber plate 22 absorbing the heat conducted from the front side 24 of the absorber plate 22. The heated liquid 31 is then collected at the bottom of the absorber plate 22 and discharged into the drain line 34. The drain line 34 discharges the heated liquid 31 into the top of the storage tank 64. While the storage tank 64 is illustrated, the apparatus 10 could equally be used for heating a swimming pool, a hot water supply system for commercial or residential use, or for any other similar requirements which need a supply of hot water or heated liquid. Also it should be recognized there are numerous types of plumbing arrangments that can be applied in the use of the apparatus 10.

In FIG. 6 a cross section of a simplified embodiment of the apparatus 10 is illustrated. In this illustration the housing 12 is eliminated and an absorber plate 22 is used with a single sheet of a transparent material 66 wrapped therearound. Again the supply tube 32 is used for feeding the liquid 31 down the backside 26 of the absorber plate 22 and the heated liquid 31 is received at the bottom of the absorber plate 22 and discharged into the drain tube 34.

Changes may be made in the construction and arrangement of the parts or elements of the embodiment as disclosed herein without departing from the spirit or scope of the invention as defined in the following claims.

I claim:

1. An apparatus for heating a liquid using solar energy, the apparatus comprising:

an absorber plate with horizontal corregations and having a frontside and a backside, the frontside of said plate positioned at an angle to face the sun, the corregations of said plate positioned transverse to the flow of a liquid as the liquid is fed across the backside of said plate and downwardly along the length of the backside of said plate;

a supply line for distributing a thin film of liquid onto the backside of said plate, the liquid flowing downwardly by gravity across the corregated surface of the backside of said plate and along the length of the backside of said plate; and a drain line disposed adjacent the bottom of the backside of said plate, said drain line receiving the heated liquid therein and discharging the liquid from the apparatus;

the top portion of said plate curved upwardly and below a portion of said supply line, said supply line disposed above the curved top portion of said plate and adjacent a vertical plane tangent to the backside of said plate at a position where the top portion of said plate starts to curve upwardly.

2. The apparatus as described in claim 1, wherein the front side of said absorber plate is covered with a dark absorbent coating.

3. The apparatus as described in claim 1, wherein said supply line includes a plurality of apertures therein for feeding the liquid across the top of the backside of said plate.

4. The appartus as described in claim 1, further including an insulated housing for receiving said absorber plate therein, said housing having an open front portion with a transparent cover mounted therein, said transparent cover disposed parallel and adjacent the front side of said absorber plate.

5. The apparatus as described in claim 4, wherein said housing includes a plurality of transparent covers disposed in a spaced relationship to each other and parallel and adjacent the front side of said absorber plate.

6. The apparatus as described in claim 1, wherein the bottom of said absorber plate is curved rearwardly and upwardly forming a U-shaped collector for receiving the heated liquid therein and feeding the liquid into said drain line.

* * * * *